(12) United States Patent
Song

(10) Patent No.: US 10,938,679 B2
(45) Date of Patent: Mar. 2, 2021

(54) PACKET MONITORING

(71) Applicant: NEW H3C TECHNOLOGIES CO., LTD., Zhejiang (CN)

(72) Inventor: Xiaoheng Song, Beijing (CN)

(73) Assignee: NEW H3C TECHNOLOGIES CO., LTD., Zhejiang (CN)

( * ) Notice: Subject to any disclaimer, the term of this patent is extended or adjusted under 35 U.S.C. 154(b) by 7 days.

(21) Appl. No.: 16/322,387

(22) PCT Filed: Aug. 1, 2017

(86) PCT No.: PCT/CN2017/095387
§ 371 (c)(1),
(2) Date: Jan. 31, 2019

(87) PCT Pub. No.: WO2018/024187
PCT Pub. Date: Feb. 8, 2018

(65) Prior Publication Data
US 2020/0186447 A1    Jun. 11, 2020

(30) Foreign Application Priority Data
Aug. 1, 2016 (CN) .......................... 201610620508.0

(51) Int. Cl.
*H04L 12/26* (2006.01)
*H04L 12/46* (2006.01)
*H04L 12/741* (2013.01)

(52) U.S. Cl.
CPC .......... *H04L 43/02* (2013.01); *H04L 12/4633* (2013.01); *H04L 12/4641* (2013.01); *H04L 45/745* (2013.01)

(58) Field of Classification Search
CPC ... H04L 43/02; H04L 12/4633; H04L 45/745; H04L 12/4641
See application file for complete search history.

(56) References Cited

U.S. PATENT DOCUMENTS 9,203,755 B1    12/2015   Wong et al.
2004/0213232 A1*  10/2004  Regan ................. H04L 12/4641
                                                             370/390
(Continued)

FOREIGN PATENT DOCUMENTS

CN    101043387 A    9/2007
CN    101252475 A    8/2008
(Continued)

OTHER PUBLICATIONS

ISA State Intellectual Property Office of the People's Republic of China, Written Opinion of the International Searching Authority Issued in Application No. PCT/CN2017/095387, dated Oct. 20, 2017, WIPO, 4 pages.
(Continued)

Primary Examiner — Rina C Pancholi
(74) Attorney, Agent, or Firm — McCoy Russell LLP

(57) ABSTRACT

VTEP receives a packet, VXLAN-encapsulates and sends a mirror packet of the packet to a remote VTEP accessed by a monitoring server, or ends the mirror packet to a local monitoring server according to the execution action of a matching first forwarding entry if the packet is a user packet from a local monitored host; VXLAN-encapsulates and sends the mirror packet to a remote VTEP accessed by the monitoring server, or sends the mirror packet to the local monitoring server according to the execution action of a matching second forwarding entry if the packet is a user packet sent from a local host to the monitored host. If the packet is a VXLAN packet with the identifier of the monitoring server from the remote VTEP, the VXLAN packet is de-encapsulated to be sent to the local monitoring server according to the execution action of a matching third forwarding entry.

10 Claims, 13 Drawing Sheets

(56) References Cited

U.S. PATENT DOCUMENTS

| | | | |
|---|---|---|---|
| 2015/0058470 A1* | 2/2015 | Duda | H04L 12/4633 709/224 |
| 2015/0169340 A1* | 6/2015 | Haddad | H04L 12/2898 718/1 |
| 2015/0215189 A1* | 7/2015 | Lim | H04L 12/4633 370/252 |
| 2015/0229724 A1 | 8/2015 | Ray et al. | |
| 2015/0280928 A1* | 10/2015 | Tessmer | H04L 12/4641 370/390 |
| 2017/0207992 A1* | 7/2017 | Huang | H04L 12/6418 |
| 2017/0257309 A1* | 9/2017 | Appanna | H04L 45/245 |
| 2018/0241629 A1* | 8/2018 | Sato | G06F 13/00 |

FOREIGN PATENT DOCUMENTS

| | | |
|---|---|---|
| CN | 104618194 A | 5/2015 |
| CN | 105099922 A | 11/2015 |
| CN | 105337884 A | 2/2016 |
| CN | 105471740 A | 4/2016 |
| CN | 105591955 A | 5/2016 |
| JP | 2016100799 A | 5/2016 |
| JP | 2019100799 A | 6/2019 |
| WO | 2012049960 A1 | 4/2012 |
| WO | 2013180207 A1 | 12/2013 |
| WO | 2016004874 A1 | 1/2016 |
| WO | 2016017737 A1 | 2/2016 |

OTHER PUBLICATIONS

European Patent Office, Extended European Search Report Issued in Application No. 17836369.3, dated Apr. 11, 2019, Germany, 7 pages.

State Intellectual Property Office of the People's Republic of China, Office Action and Search Report Issued in Application No. 201610620508.0, dated Jul. 29, 2019, 10 pages. (Submitted with Partial Translation).

Japanese Patent Office, Office Action Issued in Application No. 2019-505173, dated Nov. 26, 2019, 5 pages. (Submitted with Machine Translation).

ISA State Intellectual Property Office of the People's Republic of China, International Search Report Issued in Application No. PCT/CN2017/095387, dated Oct. 20, 2017, WIPO, 4 pages.

State Intellectual Property Office of the People's Republic of China, Office Action and Search Report Issued in Application No. 201610620508.0, dated Mar. 2, 2020, 11 pages. (Submitted with Machine Translation).

Japanese Patent Office, Office Action Issued in Application No. 2019-505173, dated Mar. 17, 2020, 5 pages. (Submitted with Machine Translation).

European Patent Office, Office Action Issued in Application No. 17836369.3, dated Jul. 24, 2020, Germany, 4 pages.

European Patent Office, Office Action Issued in Application No. 17836369.3, dated Jan. 11, 2021, Germany, 4 pages.

* cited by examiner

PACKET MONITORING

CROSS REFERENCE TO RELATED APPLICATION

The present application is a U.S. National Phase of International Patent Application Serial No PCT/CN2017/095387 entitled "PACKET MONITORING," filed on Aug. 1, 2017. International Patent Application Serial No. PCT/CN2017/095387 claims priority to Chinese Patent Application No. 201610620508.0 filed on Aug. 1, 2016. The entire contents of each of the above-cited applications are hereby incorporated by reference in their entirety for all purposes.

BACKGROUND

In a Software Defined Network (SDN) network, a controller may monitor a packet of a Virtual Machine (VM) in the following process: the controller sends an open flow entry to a Virtual Extensible Local Area Network (VXLAN) Tunnel End Point (VTEP) accessed by the monitored VM. When receiving a user packet, the VTEP may match a source address or a destination address of the user packet with the flow entry. If matched, the user packet may be mirrored to obtain a mirror packet so that the acquired mirror packet is forwarded to the controller.

Through the above process, the VTEP mirrors and forwards the user packet sent from and to the monitored VM to the controller for monitoring.

DETAILED DESCRIPTION OF THE EMBODIMENTS

Figure 1:
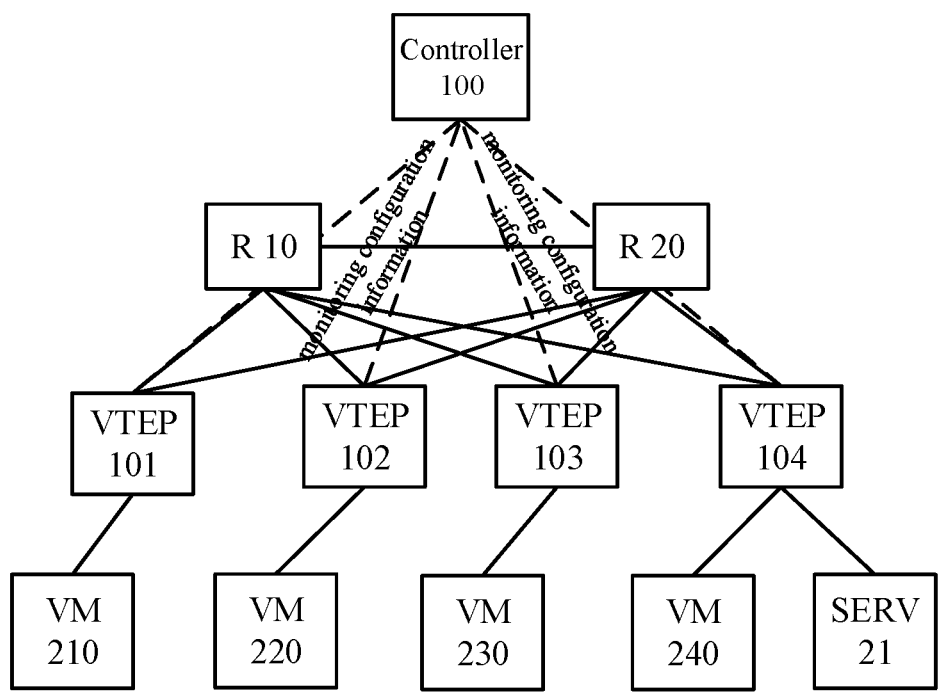
FIG. 1 illustrates a schematic diagram of networking of an SDN according to an example of the present disclosure.

Exemplary examples will be described in detail herein in conjunction with the accompanying drawings. When the following description refers to the accompanying drawings, the same reference numerals in the different drawings denote the same or similar elements unless otherwise indicated. The examples described in the following are not representative of all examples coincident with the present disclosure. In contrast, they are merely examples of devices and methods coincident with some aspects of the present disclosure as detailed in the appended claims.

The terminology used in the present disclosure is for the purpose of describing a particular example only, and is not intended to be limiting of the present disclosure. The singular forms such as "a", 'the", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, these information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

In the method for monitoring a packet described in the background, the data streams of all monitored VMs may be forwarded to a controller for monitoring. When the number of the monitored VMs is large and/or the traffic of the data streams of the monitored VMs is large, more Central Processing Unit (CPU) resources of the controller are occupied, thus affecting the performance of the controller.

Accordingly, the following example of the present disclosure provides a method of monitoring a packet, and a VTEP to which the method may be applied.

In an example of the present disclosure, an Ethernet Virtual Private Network (EVPN) technology is applied to the SDN shown in FIG. 1. That is, with EVPN as an underlay network of the SDN, routing information may be informed using a Border Gateway Protocol (BGP) on a control plane, and a user packet may be forwarded through a VXLAN encapsulation on a data plane.

In the SDN shown in FIG. 1, a controller 100, routers R10 and R20, and VTEPs 101 to 104 are included. Hosts connecting with each VTEP may be a VM or a physical device, which is not limited in the present disclosure. For example, the VMs 210 to 240 and the server SERV21 may be connected to each of the VTEPs, respectively.

The method of monitoring a packet in an example of the present disclosure includes the following.

In a SDN, the controller 100 may acquire, from each of the VTEPs, information of a host connecting with the VTEP, where the information of the host includes an Internet Protocol (IP) address and a Media Access Control (MAC) address of the host and information of a physical position where the host is located. The information of the physical position may be, for example, an identifier (ID) of a VTEP accessed by the host and an ID of a user port connecting the host on the VTEP.

The controller 100 presents an SDN network architecture on a visual interface in a way that a user may designate a monitored host by clicking, etc., and designate a monitoring server responsible for monitoring the monitored host; where the monitored host and the monitoring server may be connected to the same VTEP or may be connected to different VTEPs, which is not limited in the present disclosure.

After receiving a monitoring instruction carrying the ID of the monitored host and the ID of the monitoring server, the controller 100 may send monitoring configuration information to the VTEP accessed by the monitored host. The monitoring configuration information includes at least an address of a monitored host and an identifier (ID) of a VXLAN to which the monitored host belongs, an address of a monitoring server, and an ID of the monitoring server, where the above address may include an MAC address and/or an IP address. The ID of the monitoring server is a unique identifier which may be assigned by the controller to the monitoring server. In the actual implementation process, the controller may send the monitoring configuration information to the VTEP accessed by the monitored host through a NETCONF (network configuration) protocol.

Figure 2:
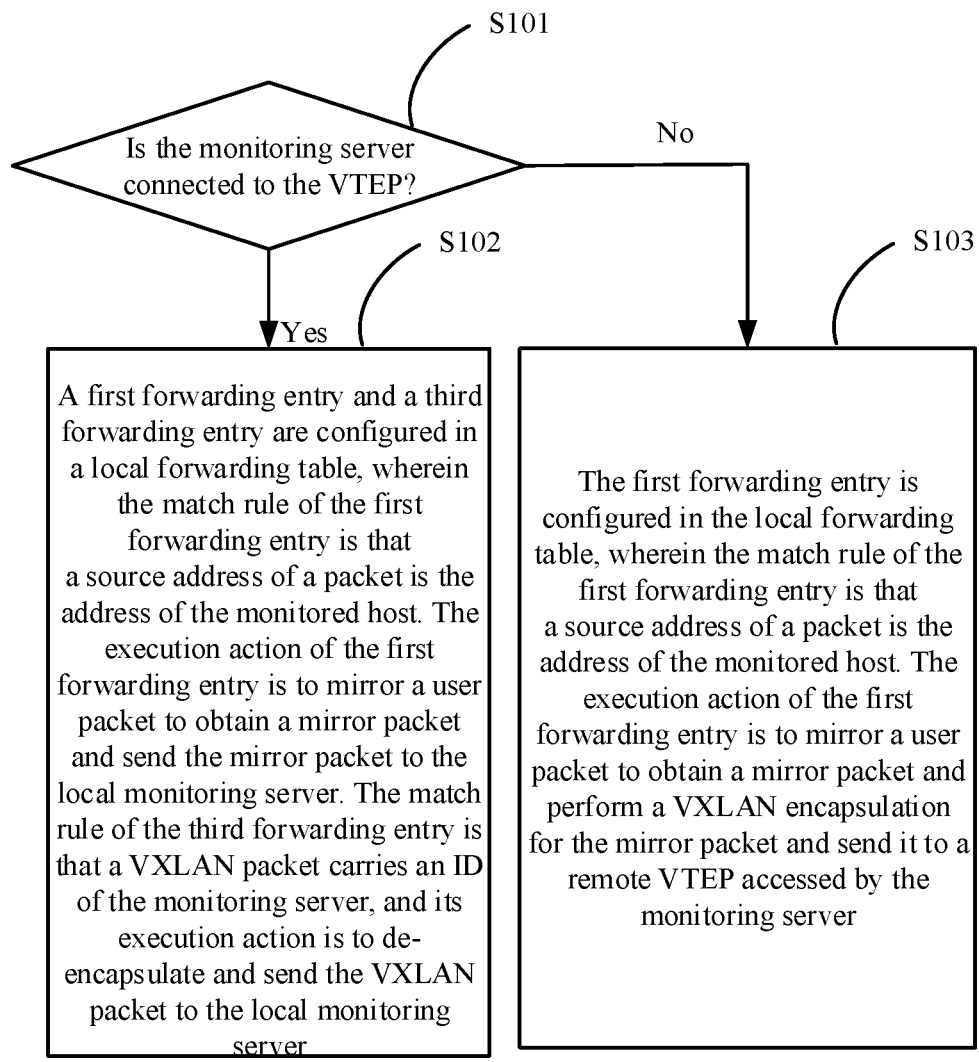
FIG. 2 illustrates a flow diagram of a process for configuring a forwarding entry performed by a VTEP accessed by a monitored host after receiving monitoring configuration information according to an example of the present disclosure.

The VTEP accessed by the monitored host receives and stores the monitoring configuration information from the controller 100, and executes the blocks shown in FIG. 2.

At block S101: The VTEP accessed by the monitored host may determine whether the monitoring server is connected to this VTEP according to the address of the monitoring server carried in the monitoring configuration information. If so, this VTEP is a VTEP accessed by both the monitored host and the monitoring server, and block S102 is executed. Otherwise, block S103 is executed.

At block S102: The VTEP may configure a first forwarding entry and a third forwarding entry in a local forwarding table. The match rule of the first forwarding entry is as follows: a source address of a packet is the address (the IP address or the MAC address) of the monitored host. The execution action of the first forwarding entry is as follows: mirror a user packet to obtain a mirror packet and send the mirror packet to a local monitoring server. The match rule of the third forwarding entry is as follows: a VXLAN packet carries an ID of a monitoring server. The execution action of the third forwarding entry is as follows: a VXLAN packet is de-encapsulated to be sent to the local monitoring server.

In the actual implementation process, the VTEP may determine a user port connecting the monitoring server on the VTEP according to the address of the monitoring server, and may send the mirror packet to the monitoring server through the user port.

At block S103: The first forwarding entry is configured in the local forwarding table. The match rule of the first forwarding entry is as follows: a source address of a packet is the address (the IP address or the MAC address) of the monitored host. The execution action of the first forwarding entry is as follows: mirror a user packet to obtain a mirror packet, perform a VXLAN encapsulation for the mirror packet to obtain a VXLAN packet, and send the VXLAN packet to a remote VTEP accessed by the monitoring server, where the VXLAN packet carries the ID of the monitoring server.

Figure 3:
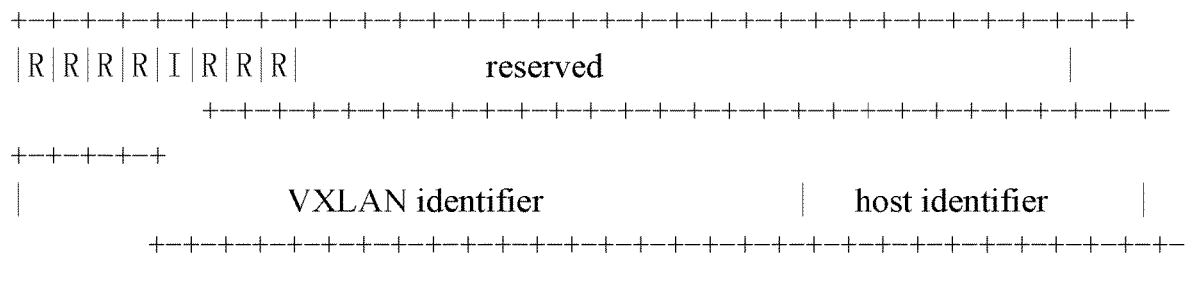
FIG. 3 illustrates a schematic diagram of a format of an extended VXLAN header according to an example of the present disclosure.

In the actual implementation process, the mirror packet may be VXLAN-encapsulated together with the ID of the monitoring server so as to obtain a VXLAN packet, and the VXLAN packet may be sent to the remote VTEP accessed by the monitoring server. Therefore the VXLAN packet will carry the ID of the monitoring server. Thus, in an example of the present disclosure, a VXLAN header of a VXLAN packet is extended in a format as shown in FIG. 3. The HOST ID field in the header is used for carrying the ID of the monitoring server.

Through the above blocks S101 to S103, the VTEP accessed by both the monitored host and the monitoring server not only configures the first forwarding entry but also configures the third forwarding entry; and the VTEP accessed by the monitored host and not accessed by the monitoring server only configures the first forwarding entry.

In addition, after receiving the monitoring configuration information from the controller 100, the VTEP accessed by the monitored host may also send the monitoring configuration information to all remote VTEPs belonging to the VXLAN carried in the monitoring configuration information. In the actual implementation process, because the BGP may be adopted on a control plane, the monitoring configuration information is carried in a BGP packet to be flooded in the VXLAN, so that the information is flooded to all remote VTEPs in the VXLAN.

Figure 4:
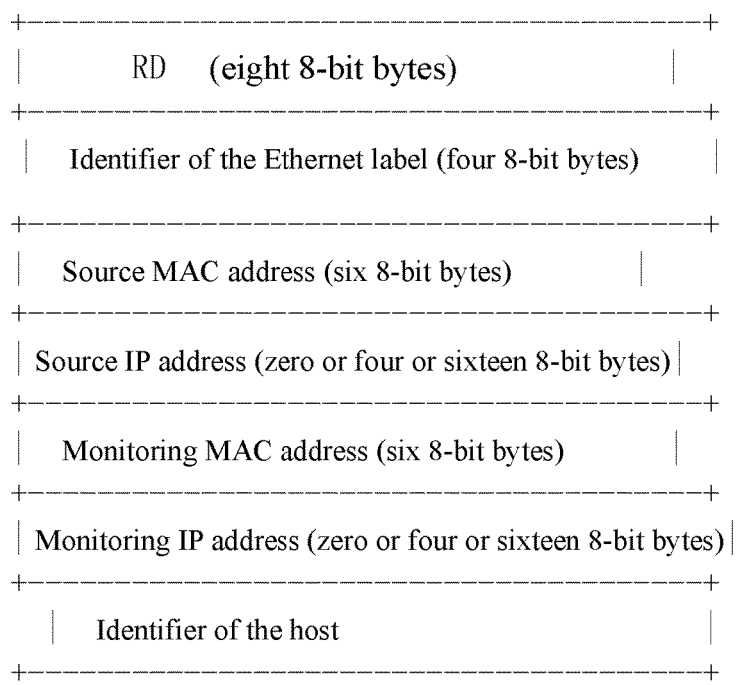
FIG. 4 illustrates a schematic diagram of a format of a BGP packet carrying monitoring configuration information according to an example of the present disclosure.

The format of the BGP packet carrying the monitoring configuration information is as shown in FIG. 4, where the Source MAC Address field is used to carry the MAC address of the monitored host, and the Source IP Address field is used to carry the IP address of the monitored host, the Monitor MAC Address field is used to carry the MAC address of the monitoring server, the Monitor IP Address field is used to carry the IP address of the monitoring server, and the HOST ID field is used to carry the ID of the monitoring server.

Figure 5:
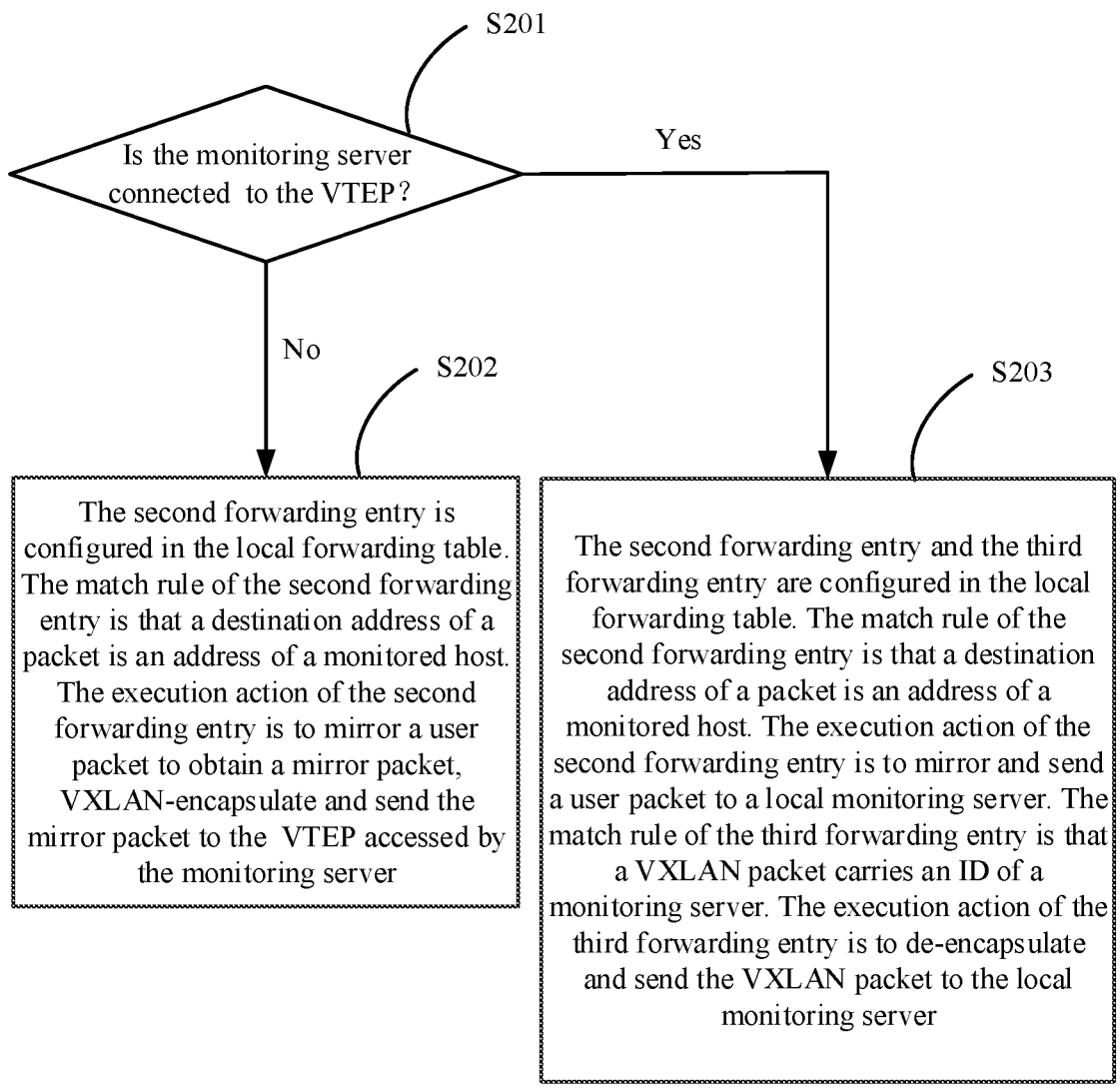
FIG. 5 illustrates a flow diagram of a process for configuring a forwarding entry performed by a VTEP not accessed by a monitored host after receiving monitoring configuration information according to an example of the present disclosure.

The remote VTEP not accessed by the monitored host may store the monitoring configuration information after receiving the monitoring configuration information, and also may perform the blocks shown in FIG. 5.

At block S201: The remote VTEP not accessed by the monitored host may determine whether the monitoring server is connected to this VTEP according to the address of the monitoring server carried in the monitoring configuration information. If not, block S202 is executed. If so, it indicates that this VTEP is a VTEP accessed by the monitoring server, and Block S203 is executed.

At block S202: This VTEP may configure the second forwarding entry in the local forwarding table. The match rule of the second forwarding entry is as follows: a destination address of a packet is an address of a monitored host. The execution action of the second forwarding entry is as follows: mirror a user packet to obtain a mirror packet, perform a VXLAN encapsulation for the mirror packet to obtain a VXLAN packet, and send the obtained VXLAN packet to the remote VTEP accessed by the monitoring server, where the VXLAN packet carries the ID of the monitoring server.

At block S203: The second forwarding entry and the third forwarding entry are configured in the local forwarding table. The match rule of the second forwarding entry is as follows: a destination address of a packet is an address of a monitored host. The execution action of the second forwarding entry is as follows: mirror a user packet to obtain a mirror packet and send the mirror packet to a local monitoring server. The match rule of the third forwarding entry is as follows: a VXLAN packet carries an ID of the monitoring server. The execution action of the third forwarding entry is as follows: the VXLAN packet is de-encapsulated to be sent to the local monitoring server.

Through the above blocks S201 to S203, the VTEP not accessed by the monitored host and the monitoring server only configures the second forwarding entry, while the VTEP not accessed by the monitored host and accessed by the monitoring server not only configures the second forwarding entry but also configures the third forwarding entry.

Thus, the VTEP accessed by the monitored host and not accessed by the monitoring server configures the first forwarding entry, the VTEP accessed by the monitored host and the monitoring server configures the first forwarding entry and the third forwarding entry, the VTEP not accessed by the monitored host and the monitoring server configures the second forwarding entry, and the VTEP not accessed by the monitored host and accessed by the monitoring server configures the second forwarding entry and the third forwarding entry.

Figure 6:
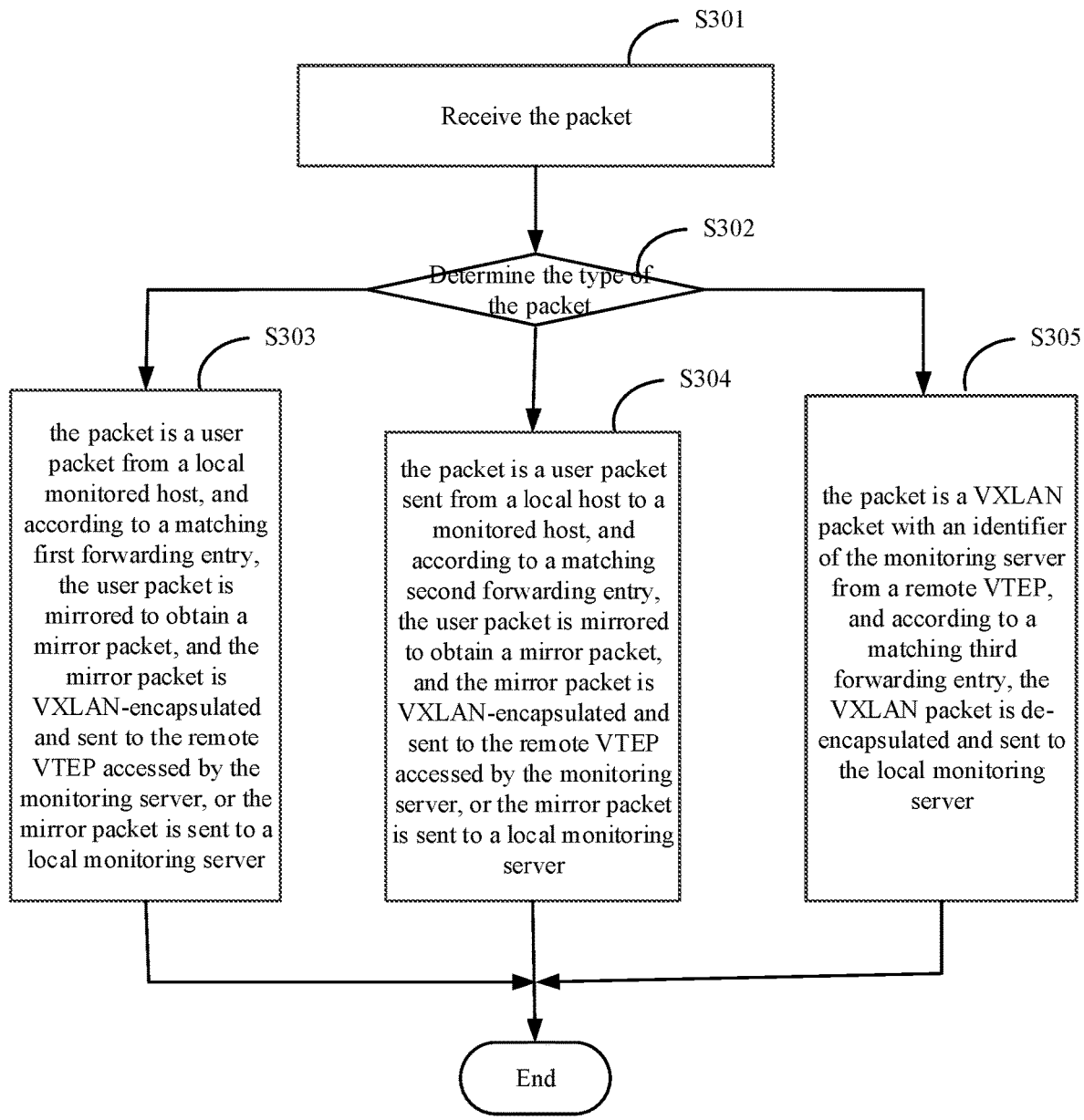
FIG. 6 illustrates a flow diagram of forwarding a packet by a VTEP after receiving the packet according to an example of the present disclosure.

FIG. 6 illustrates a flow diagram of forwarding a packet by a VTEP after receiving the packet according to an example of the present disclosure.

At block S301: The VTEP may receive the packet.

At block S302: The VTEP may determine the type of the packet.

If the packet is a user packet from a local monitored host, the flow proceeds to block S303. At block S303, according to a matching first forwarding entry, the VTEP mirrors the packet to obtain a mirror packet, and performs a VXLAN encapsulation for the mirror packet and sends the mirror packet having subjected to the VXLAN encapsulation to the remote VTEP accessed by the monitoring server, or sends the mirror packet to the local monitoring server.

If the packet is a user packet sent from a local host to a monitored host, the flow proceeds to block S304. At block S304, according to a matching second forwarding entry, the VTEP mirrors the packet to obtain a mirror packet, and performs a VXLAN encapsulation for the mirror packet and sends the mirror packet having subjected to the VXLAN encapsulation to the remote VTEP accessed by the monitoring server, or sends the mirror packet to the local monitoring server.

If the packet is a VXLAN packet coming from a remote VTEP and carrying the identifier of the monitoring server, the flow proceeds to block S305. At block S305, the VTEP de-encapsulates and sends the VXLAN packet to the local monitoring server according to a matching third forwarding entry.

If the VTEP is a VTEP accessed by the monitored host, the VTEP determines the type of the packet by determining whether the packet hits the first forwarding entry in block S302. If the packet hits the first forwarding entry, the VTEP determines that the packet is a user packet from the local monitored host and performs the operation in block S303.

At block S303, the mirror packet is VXLAN-encapsulated together with the ID of the monitoring server and a VXLAN packet obtained by the encapsulation is then sent to the remote VTEP accessed by the monitoring server.

If the VTEP is a VTEP not accessed by the monitored host, the VTEP determines the type of the packet by determining whether the packet hits the second forwarding entry in block S302. If the packet hits the second forwarding entry, the VTEP determines that the packet is a user packet from the local host and performs the operation in block S304.

At block S304, when the packet is mirrored and VXLAN-encapsulated, the obtained mirror packet may be VXLAN-encapsulated together with the ID of the monitoring server, and a VXLAN packet obtained by the encapsulation may be then sent to the remote VTEP accessed by the monitoring server.

If the VTEP is a VTEP accessed by the monitoring server, the VTEP determines the type of the packet by determining whether the packet hits the third forwarding entry in block S302. If the packet hits the third forwarding entry, the VTEP determines that the packet is a VXLAN packet coming from the remote VTEP and carrying the identifier of the monitoring server, and performs the operation in block S305.

In the actual implementation, in block S302, when determining the type of the packet, the VTEP may first determine whether the packet is a user packet or a VXLAN packet. For example, the VTEP may determine whether the port receiving the packet is a user-side port or a public-network-side port. If the port is a user-side port, it indicates that the packet is a user packet from a virtual machine. If the port is a public-network-side port, it indicates that the packet is a VXLAN packet received through a VXLAN tunnel. Then, the VTEP matches the received user packet or the received VXLAN packet with the local forwarding entry.

Figure 7:
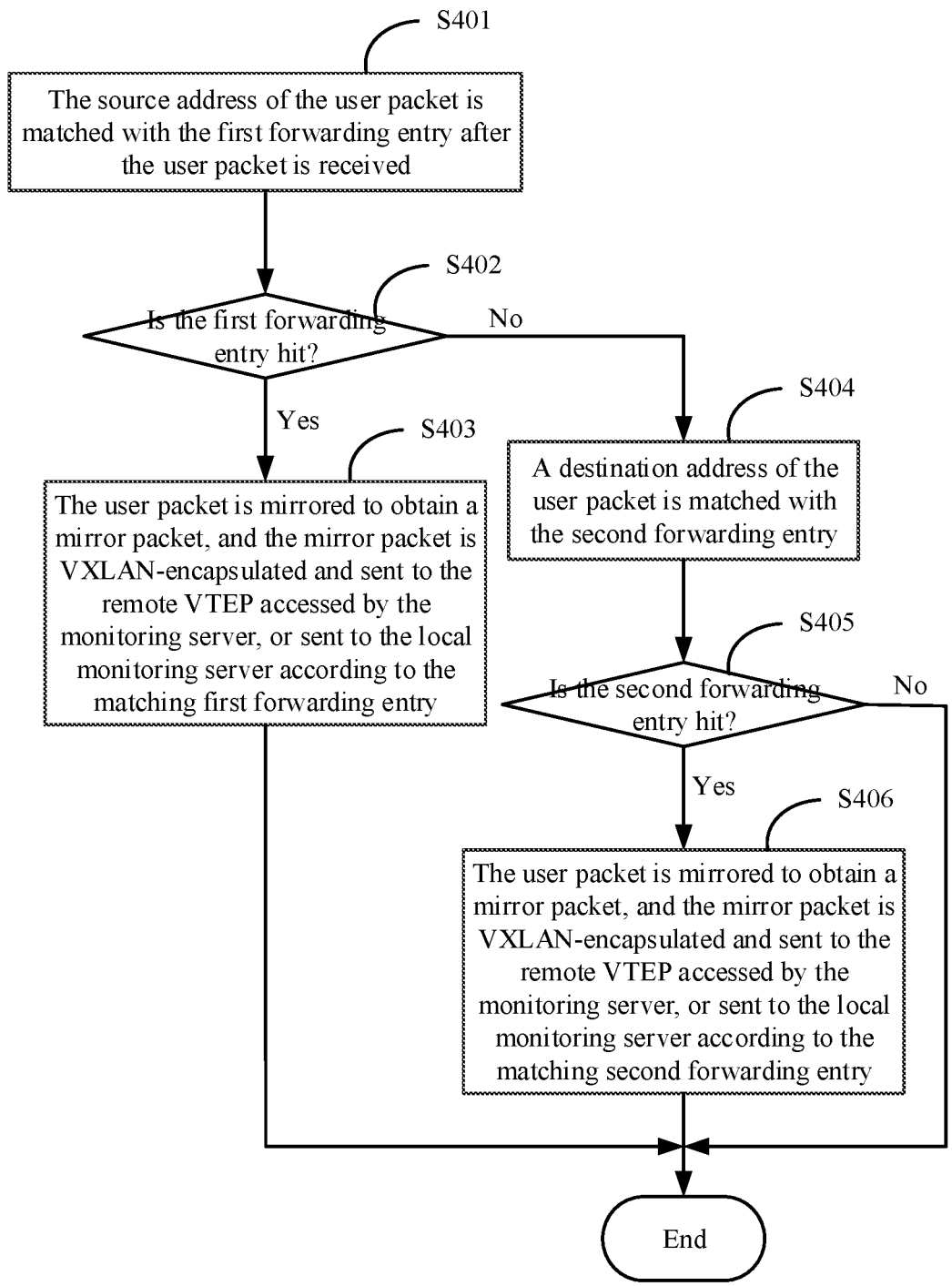
FIG. 7 illustrates a flow diagram of forwarding a user packet by a VTEP after receiving the user packet according to an example of the present disclosure.

In an example of the present disclosure, there is also such a case that a local host accessing the same VTEP as the monitored host sends a packet to the monitored host. In this case, the operation performed by the VTEP after a user packet is received is described referring to FIG. 7.

At block S401: The VTEP may match the source address of the user packet with the first forwarding entry after receiving the user packet.

At block S402: The VTEP may determine whether the first forwarding entry is hit. If so, it is determined that the user packet is a user packet from the local monitored host and block S403 is executed. Otherwise, block S404 is executed.

At block S403: The VTEP may mirror the user packet to obtain a mirror packet, and perform a VXLAN encapsulation for the mirror packet and send the mirror packet having subjected to the encapsulation to a remote VTEP accessed by the monitoring server, or send the mirror packet to the local monitoring server according to the matching first forwarding entry; then the flow is exited.

Herein, the mirror packet may be VXLAN-encapsulated together with the ID of the monitoring server and a VXLAN packet obtained by the encapsulation is then sent to a remote VTEP accessed by the monitoring server in the block 403.

At block S404: The VTEP may match the destination address of the user packet with the second forwarding entry.

At block S405: The VTEP may determine whether the second forwarding entry is hit. If so, it is determined that the user packet is a user packet from the local host and block S406 is executed. Otherwise, the flow is exited.

At block S406: According to the matching second forwarding entry, the VTEP may mirror the user packet, and perform a VXLAN encapsulation for the mirror packet and send a VXLAN packet obtained by the encapsulation to a remote VTEP accessed by the monitoring server, or send the VXLAN packet to the local monitoring server.

Herein, the mirror packet may be VXLAN-encapsulated together with the ID of the monitoring server and the VXLAN packet obtained by the encapsulation is then sent to the remote VTEP accessed by the monitoring server in the block S406.

Thus, through the above Blocks S401 to S406, the VTEP accessed by the monitored host may mirror and send the user packet sent from the monitored host to the remote VTEP accessed by the monitoring server through a VXLAN tunnel, or mirror and send the user packet to the local monitoring server; the VTEP may mirror and send the user packet sent from the local host to the monitored host, to the remote VTEP accessed by the monitoring server through a VXLAN tunnel, or mirror and send the user packet to the local monitoring server.

Figure 8:
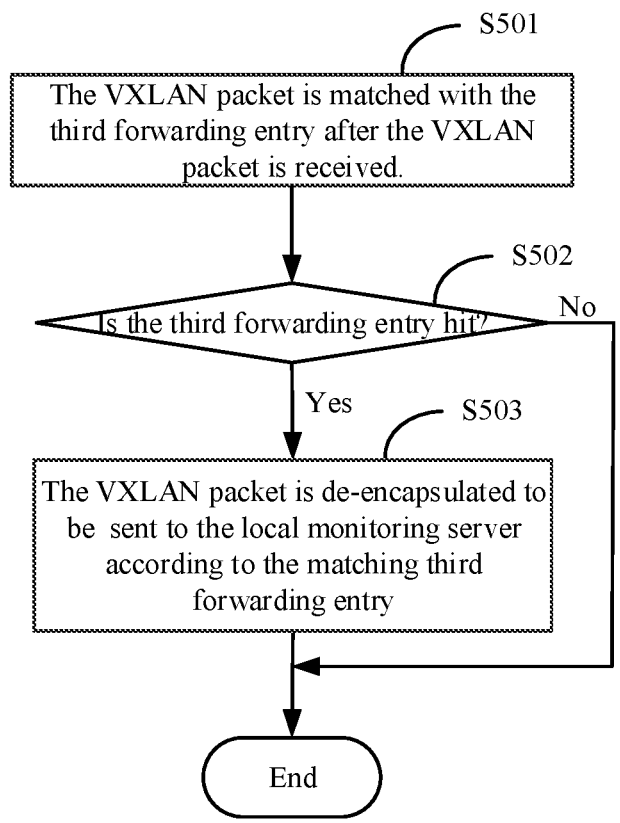
FIG. 8 illustrates a flow diagram of forwarding a VXLAN packet by a VTEP after receiving the VXLAN packet according to an example of the present disclosure.

The VTEP may perform blocks as shown in FIG. 8 after receiving a VXLAN packet.

At block S501: The VTEP may match the VXLAN packet with the third forwarding entry after receiving the VXLAN packet.

At block S502: The VTEP may determine whether the VXLAN packet hits the third forwarding entry. If so, it is determined that the VXLAN packet is a VXLAN packet coming from a remote VTEP and carrying the identifier of the monitoring server, and block S503 is executed. Otherwise, the flow is exited.

At block S503: The VTEP may de-encapsulate and send the VXLAN packet to the local monitoring server according to the matching third forwarding entry.

Specifically, in Block S503, the VXLAN packet is de-encapsulated to obtain a user packet and the user packet is then forwarded to the monitoring server through a user port connecting the monitoring server on the VTEP. Thus, the monitoring server may monitor the user packet.

In the method of the above example, according to the execution action of a matching first forwarding entry, a VTEP accessed by a monitored host performs a VXLAN encapsulation for a mirror packet of a user packet after receiving the user packet from the monitored host, and send a VXLAN packet obtained by the encapsulation to a remote VTEP accessed by a monitoring server, or sends the mirror packet of the user packet to a local monitoring server. According to the execution action of a matching second forwarding entry, a VTEP not accessed by a monitored host performs a VXLAN encapsulation for a mirror packet of a user packet after receiving the user packet sent from a local host to the monitored host, and send a VXLAN packet obtained by the encapsulation to a remote VTEP accessed by a monitoring server, or sends the mirror packet of the user packet to a local monitoring server, where the VXLAN packet carries the identifier of the monitoring server. According to the execution action of a matching third forwarding entry, a VTEP accessed by a monitoring server de-encapsulates and sends a VXLAN packet to the local monitoring server after receiving the VXLAN packet coming from a remote VTEP and carrying the identifier of the monitoring server. Thus, the monitoring of the packet sent from and to the monitored host may be achieved.

In the above method, it is not necessary for a controller to perform a monitoring operation but acquire a monitoring result from a monitoring server, thus saving the CPU resources of the controller and improving the performance of the controller.

It should be noted that: in the actual implementation process, a VTEP may be used as a VTEP accessed by a monitored host, or a VTEP not accessed by the monitored host, or a VTEP accessed by a monitoring server. The VTEP may perform a corresponding operation when acting as a different role.

A VM may migrate in a SDN. When a monitored host migrates, the VTEP, after detecting that the monitored host has migrated into the VTEP, may send the address of the monitored host to all remote VTEPs within the VXLAN to which the VM belongs, through a BGP packet. And the VTEP may search the local forwarding table for the second forwarding entry of which the packet destination address in a match rule is the address of the monitored host. Then the VTEP may update the searched second forwarding entry to be a first forwarding entry of which the packet source address in the match rule is the address of the monitored host.

The remote VTEP (that is, a VTEP not currently accessed by the monitored host) may determine whether it is the VTEP that the monitored host has migrated out of after receiving the BGP packet carrying the address of the monitored host. When determining that it is the VTEP that the monitored host has migrated out of, the remote VTEP searches the local forwarding table for the first forwarding entry of which the packet source address in the match rule is the address of the monitored host, and updates the searched first forwarding entry to be the second forwarding entry of which the packet destination address in the match rule is the address of the monitored host. Thus, the remote VTEP becomes the VTEP not accessed by the monitored host.

The specific method of detecting that the monitored host has migrated into the VTEP may be as follows: after an Address Resolution Protocol (ARP) packet carrying the address of a VM is received, wherein the ARP packet is sent from the VM after the VM migrates, determining that the VM is the monitored host according to locally stored monitoring configuration information; updating a MAC entry corresponding to the MAC address; and determining that the monitored host has migrated into the VTEP if the MAC address is found to correspond to a VXLAN tunnel before the updating and correspond to a local user port after the updating.

The specific method of determining that it is the VTEP that the monitored host has migrated out of may be as follows: after the BGP packet carrying the address of the VM is received, determining that the VM is the monitored host according to the locally stored monitoring configuration information; updating the MAC entry corresponding to the MAC address; and determining that it is the VTEP that the monitored host has migrated out of if the MAC address is found to correspond to the local user port before the updating, and correspond to the VXLAN tunnel after the updating.

In addition, when the monitoring server has migrated, the VTEP, after detecting that the monitoring server moves into the VTEP, may send the address of the monitoring server to all remote VTEPs within the VXLAN to which the monitoring server belongs, through the BGP packet. The VTEP may confirm the address of the monitored host corresponding to the monitoring server and the identifier of the monitoring server according to the locally stored monitoring configuration information. Then the VTEP may search the local forwarding table for the first forwarding entry of which the packet source address in the match rule is the address of the monitored host or the second forwarding entry of which the packet destination address in the match rule is the address of the monitored host. The VTEP may update the execution action of the searched first forwarding entry or the searched second forwarding entry so as to mirror the packet to obtain a mirror packet, and send the mirror packet to the local monitoring server. The VTEP may configure a third forwarding entry in the local forwarding table, where the monitoring server identifier in the match rule of the third forwarding entry is the identifier of the monitoring server migrated into the VTEP.

Figure 9:
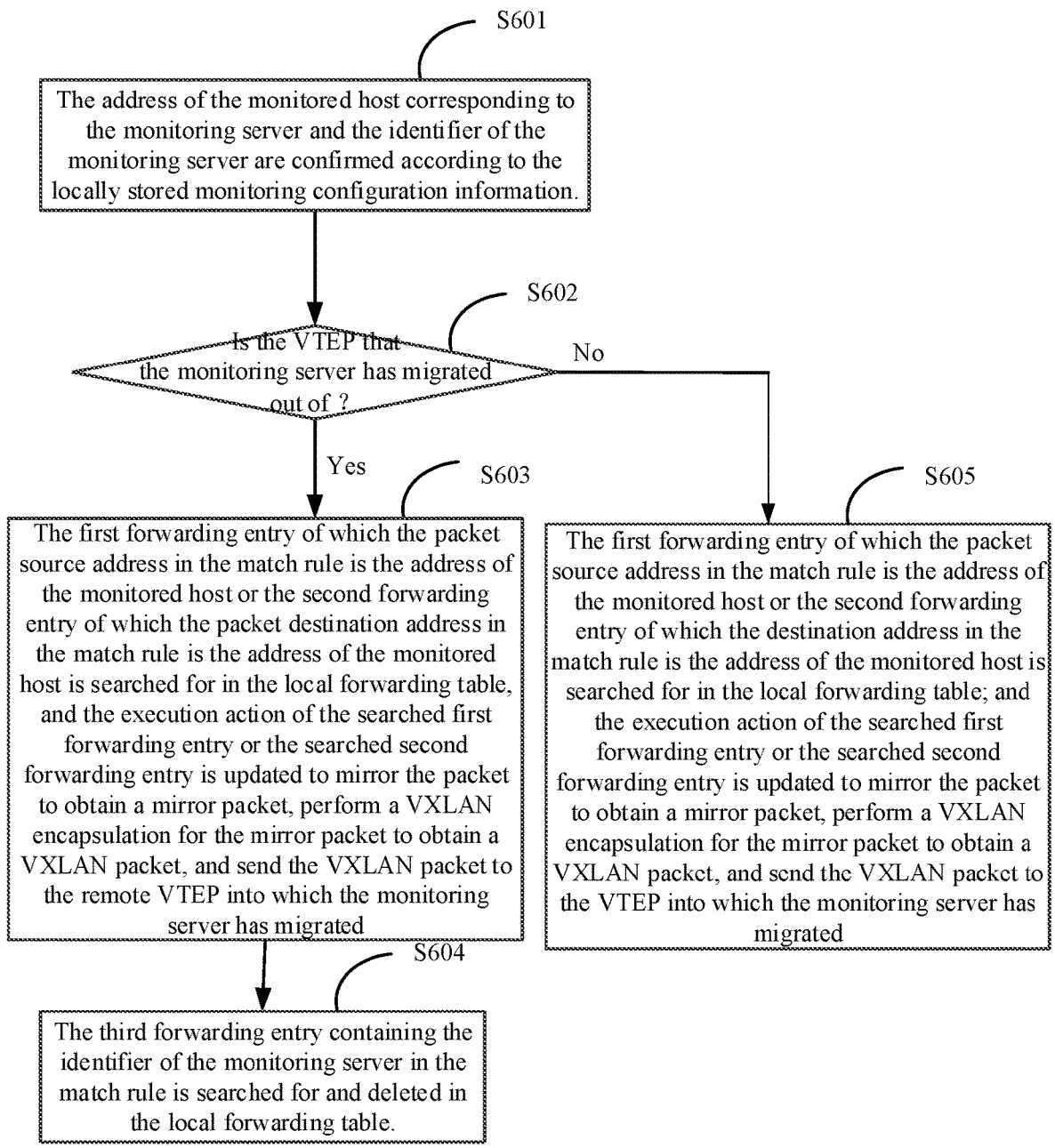
FIG. 9 illustrates a flow diagram of updating a forwarding entry by a VTEP after receiving an address of a monitoring server according to an example of the present disclosure.

The remote VTEP (that is, the VTEP not currently accessed by the monitoring server) may perform the operation shown in FIG. 9 after receiving the BGP packet carrying the address of the monitoring server.

At block S601: The VTEP may confirm the address of the monitored host corresponding to the monitoring server and the identifier of the monitoring server according to the locally stored monitoring configuration information.

At block S602: The VTEP may determine whether it is the VTEP that the monitoring server has migrated out of, and if so, blocks S603 and S504 are executed, otherwise, block S605 is executed.

At block S603: The VTEP may search the local forwarding table for the first forwarding entry of which the packet source address in the match rule is the address of the monitored host or the second forwarding entry of which the packet destination address in the match rule is the address of the monitored host, and update the execution action of the searched first forwarding entry or the searched second forwarding entry so as to mirror the packet to obtain a mirror packet, perform a VXLAN encapsulation for the mirror packet to obtain a VXLAN packet, and send the VXLAN packet to the remote VTEP into which the monitoring server has migrated.

At block S604: The VTEP may search the local forwarding table for the third forwarding entry of which the match rule contains the identifier of the monitoring server and delete the third forwarding entry.

At block S605: The VTEP may search the local forwarding table for the first forwarding entry of which the packet source address in the match rule is the address of the monitored host or the second forwarding entry of which the packet destination address in the match rule is the address of the monitored host; and update the execution action of the searched first forwarding entry or the searched second forwarding entry so as to mirror the packet to obtain a mirror packet, perform a VXLAN encapsulation for the mirror packet to obtain a VXLAN packet, and send the VXLAN packet to the VTEP into which the monitoring server has migrated.

The specific method of detecting that the monitoring server has migrated into the VTEP may be as follows: after an Address Resolution Protocol (ARP) packet carrying the address of a VM is received, wherein the ARP packet is sent from the VM after the VM migrates, determining that the VM is the monitoring server according to the locally stored monitoring configuration information; updating a MAC entry corresponding to the MAC address; and determining that the monitoring server has migrated into the VTEP if the MAC address is found to correspond to a VXLAN tunnel before the updating, and correspond to a local user port after the updating.

The specific method of determining that it is the VTEP that the monitoring server has migrated out of may be as follows: after a BGP packet carrying the address of a VM is received, determining that the VM is the monitoring server according to the locally stored monitoring configuration information; updating a MAC entry corresponding to the MAC address; and determining that it is the VTEP that the monitoring server has migrated out of if the MAC address is found to correspond to a local user port before the updating, and correspond to a VXLAN tunnel after the updating.

In the method of the above example, each VTEP may dynamically update the first forwarding entry, the second forwarding entry, and the third forwarding entry on the VTEP when the monitored host and the monitoring server have migrated, thus achieving the monitoring of a packet when the monitored host and the monitoring server have migrated.

Taking SDN as shown in FIG. 1 as an example, an EVPN technology is applied in the SDN. VM210 to VM240 belong to the same VXLAN1, VTEP104 is connected with a monitoring server SERV21, and a VXLAN tunnel is established between any two VTEPs of VTEP101 to VTEP104. A NETCONF protocol connection is established between a controller 100 and each VTEP for transmitting monitoring configuration information. The ID of the SERV21 is HOST ID1. The MAC address of each VM is represented as VM-MAC. The IP address of each VM is represented as VM-IP. The MAC address of each VTEP is represented as VTEP-MAC and the IP address of each VTEP is represented as VTEP-IP.

The controller 100 sends monitoring configuration information to the VTEP 101 through the NETCONF protocol, where the monitoring configuration information includes the MAC address and the IP address of the monitored host VM 210, the VXLAN to which the VM 210 belongs, the MAC address and the IP address, and HOST ID1 of the monitoring server SERV21.

After receiving the monitoring configuration information, the VTEP 101 stores the monitoring configuration information, configures the first forwarding entry as shown in the second line of Table 1-1 in the local forwarding table, and sends the monitoring configuration information to the VTEP102 to the VTEP104 in VXLAN1 through a BGP packet.

TABLE 1-1

| Match rule | action |
| --- | --- |
| Source IP address: VM210-IP | To mirror a user packet to obtain a mirror packet, and perform a VXLAN encapsulation for the mirror packet together with the HOST ID1 to obtain a VXLAN packet, and send the VXLAN packet to the VTEP104 |

After receiving the monitoring configuration information through the BGP packet, the VTEP102 and the VTEP103 store the monitoring configuration information and configure the second forwarding entry as shown in the second line of Table 2-1 in the local forwarding table; after receiving the monitoring configuration information through the BGP packet, the VTEP104 stores the monitoring configuration information and configures the second forwarding entry as shown in the second line of Table 3-1 and the third forwarding entry as shown in the third line in Table 3-1 in the local forwarding table.

TABLE 2-1

| Match rule | action |
| --- | --- |
| Destination IP address: VM210-IP | To mirror a user packet to obtain a mirror packet, and perform a VXLAN encapsulation for the mirror packet together with HOST ID1 to obtain a VXLAN packet, and send the VXLAN packet to the VTEP104 |

TABLE 3-1

| Match rule | action |
| --- | --- |
| Destination IP address: VM210-IP | To mirror a user packet to obtain a mirror packet, and send the mirror packet to the local SERV21. |
| HOST ID: HOST ID1 | To de-encapsulate the VXLAN packet to obtain a packet, and send the packet to the local SERV21. |

When the VM210 is to access the VM230, a user packet of which the source IP address is VM210-IP and the destination IP address is VM230-IP is sent out. After receiving the user packet, on the one hand, the VTEP 101 queries a forwarding table to forward the user packet according to the destination IP address of the user packet in a way that the user packet is VXLAN-encapsulated to obtain a VXLAN packet and then the VXLAN packet is forwarded to the VTEP 103. On the other hand, the VTEP 101 matches the user packet with the first forwarding entry as shown in the second line of Table 1-1. If the user packet hits the first forwarding entry, the user packet is mirrored to obtain a mirror packet, the mirror packet is VXLAN-encapsulated together with the HOST ID1 to obtain a VXLAN packet, and the VXLAN packet is sent to the VTEP104.

After receiving the VXLAN packet, the VTEP 104 matches the VXLAN packet with the third forwarding entry as shown in the third line of Table 3-1. If the VXLAN packet hits the third forwarding entry, the VXLAN packet is de-encapsulated to obtain a user packet. The user packet is then sent to the SERV21 to be monitored by the SERV21.

After receiving the VXLAN packet, the VTEP 103 de-encapsulates the packet to obtain a user packet and forwards the user packet to the VM230. After receiving the user packet, the VM230 sends a user packet of which the source IP address is VM230-IP and the destination IP address is VM210-IP as a response. After receiving the user packet, on the one hand, the VTEP 103 queries a forwarding table to forward the user packet according to the destination IP address of the user packet in a way that the user packet is VXLAN-encapsulated to obtain a VXLAN packet and then the VXLAN packet is forwarded to the VTEP 101. On the other hand, the VTEP 103 matches the user packet with the second forwarding entry as shown in the second line of Table 2-1. If the user packet hits the second forwarding entry, the user packet is mirrored to obtain a mirror packet, and then the mirror packet is VXLAN-encapsulated together with HOST ID1 to obtain a VXLAN packet, and the VXLAN packet is sent to the VTEP 104.

After receiving the VXLAN packet, the VTEP 104 matches the VXLAN packet with the third forwarding entry as shown in the third line of Table 3-1. If the VXLAN packet hits the third forwarding entry, the VXLAN packet is de-encapsulated to obtain a user packet and then the user packet is sent to the SERV21 to be monitored by the SERV21.

According to the above process, the SERV21 achieves the monitoring of a user packet sent from and to the VM210. The controller may regularly acquire the monitoring results from the SERV21.

Figure 10:
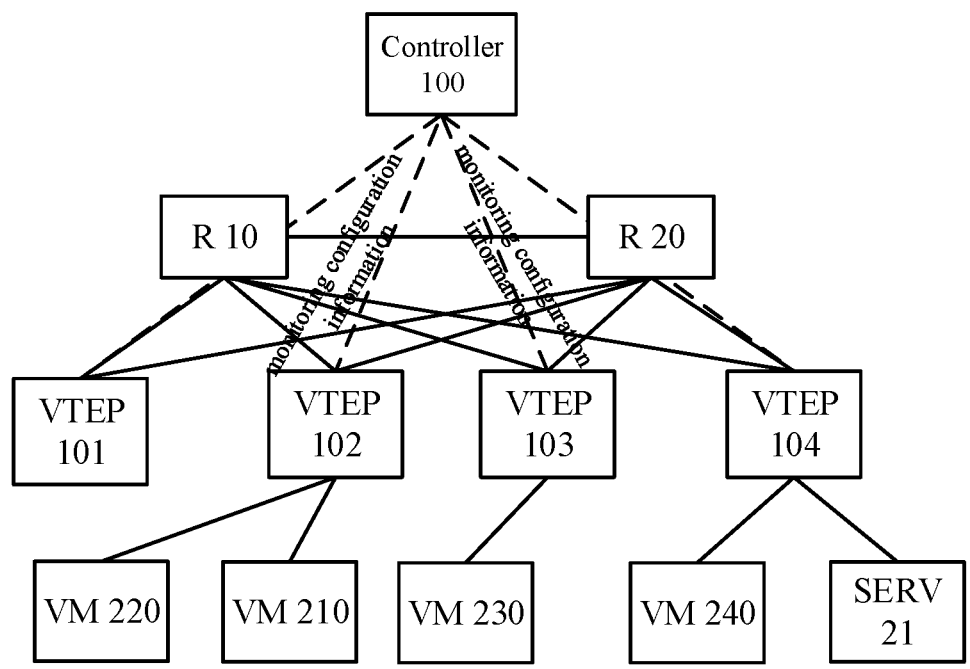
FIG. 10 illustrates a schematic diagram of networking after VM10 migrates in FIG. 1.

Subsequently, when the VM210 has migrated from VTEP 101 to the VTEP 102, as shown in FIG. 10, if the VTEP 102 determines that the VM210 is the monitored host according to the local configuration information after detecting that the VM210 has migrated to the VTEP, the VTEP 102 sends the MAC address VM210-MAC and the IP address VM210-IP of the VM210 to the VTEP 101, VTEP 103, and VTEP 104 through a BGP packet; and updates the second forwarding entry as shown in the second line of Table 2-1 to be the first forwarding entry of which the packet source address in the match rule is the IP address VM210-IP of VM210, where the first forwarding entry is as shown in the second line of Table 2-2.

TABLE 2-2

| Match rule | action |
| --- | --- |
| Source IP address: VM210-IP | To mirror a user packet to obtain a mirror packet, and perform a VXLAN encapsulation for the mirror packet together with HOST ID 1 to obtain a VXLAN packet, and send the VXLAN packet to the VTEP104 |

After receiving the MAC address and the IP address of the VM210 from the VTEP 102 through the BGP packet, the VTEP 101 determines that the VM210 is the monitored host according to the local configuration information, and when determining that the VM210 has migrated out of the VTEP, the VTEP 101 updates the first forwarding entry as shown in the second line of Table 1-1 to be the second forwarding entry of which the packet destination address in the match rule is the VM210-IP, where the second forwarding entry is as shown in the second line of Table 1-2.

After receiving the MAC address and the IP address of the VM210 from the VTEP 102 through the BGP packet, the VTEP 103 and the VTEP 104 determine that the VM210 is the monitored host according to the local configuration information. However, if it is determined that it is not the VTEP that the VM210 has migrated out of, the second forwarding entry will not be updated.

TABLE 1-2

| Match rule | action |
| --- | --- |
| Destination IP address: VM210-IP | To mirror a user packet to obtain a mirror packet, and perform a VXLAN encapsulation for the mirror packet together with HOST ID1 to obtain a VXLAN packet, and send the VXLAN packet to the VTEP 104 |

Figure 11:
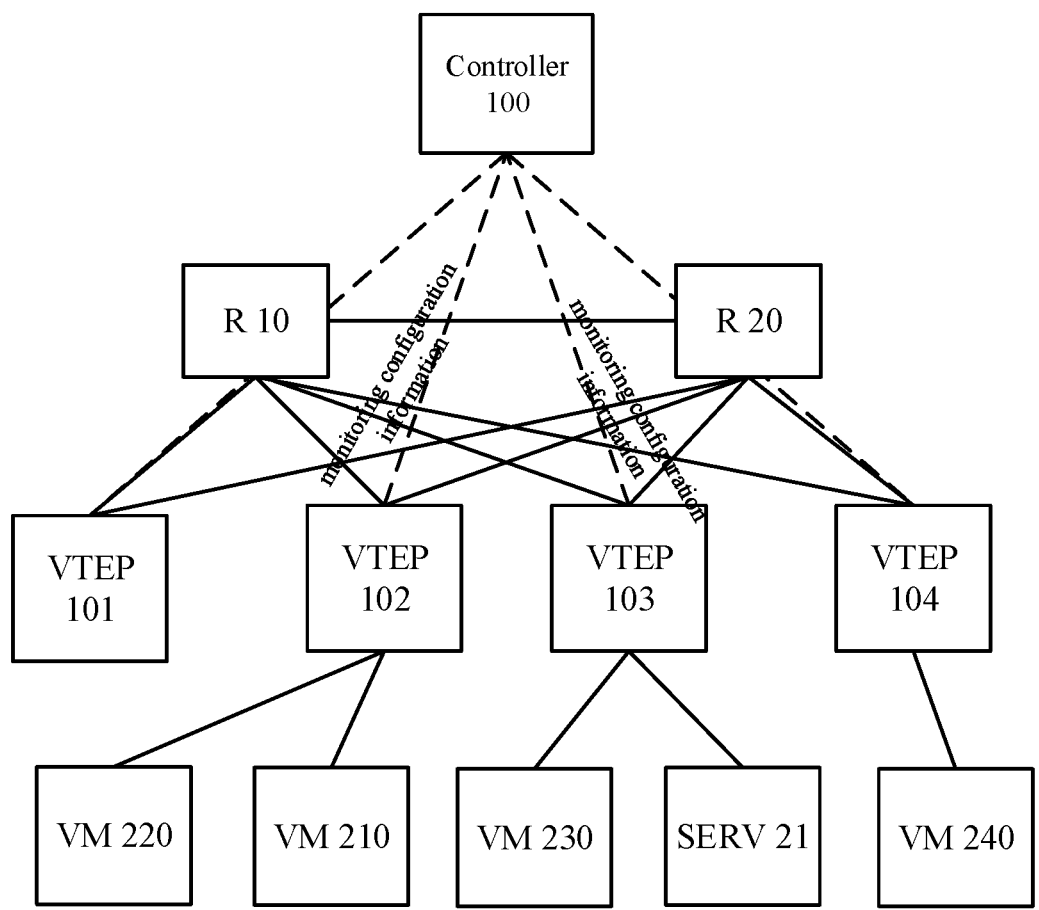
FIG. 11 illustrates a schematic diagram of networking after SERV21 migrates in FIG. 10.

When the monitoring server SERV21 has migrated from the VTEP 104 to the VTEP 103, as shown in FIG. 11, the VTEP 103, after detecting that the SERV21 has migrated to the VTEP, determines that the SERV21 is the monitoring server according to the locally stored monitoring configuration information and determines the ID of SERV21 to be HOST ID1 as well as the MAC address and IP address of the corresponding monitored host VM210. And then the VTEP 103 sends the address of the SERV21 to the VTEP 101, the VTEP 102, and the VTEP 104 through the BGP packet and updates the second forwarding entry as shown in the second line of Table 2-1 to be as shown in the second line of Table 4-1. In addition, the VTEP 103 may also configure the third forwarding entry as shown in the third line of Table 4-1 in the local forwarding table.

TABLE 4-1

| Match rule | action |
| --- | --- |
| Destination IP address: VM210-IP | To mirror a user packet to obtain a mirror packet, and send the mirror packet to the local SERV21 |
| HOST ID: HOST ID1 | To de-encapsulate a VXLAN packet to obtain a packet, and send the packet to the local SERV21 |

After receiving the address of the SERV21 from the VTEP 103 through the BGP packet, the VTEP 104 determines that the SERV21 is the monitoring server according to the locally stored monitoring configuration information and determines the ID of SERV21 to be HOST ID1 as well as the MAC address and IP address of the corresponding monitored host VM210, and when determining that it is the VTEP that the SERV21 has migrated out of, updates the second forwarding entry as shown in the second line of Table 3-1 to be as shown in the second line of Table 3-2; and also deletes the third forwarding entry as shown in line 3 of Table 3-1.

TABLE 3-2

| Match rule | action |
| --- | --- |
| Destination IP address: VM210-IP | To mirror a user packet to obtain a mirror packet, perform a VXLAN encapsulation for the mirror packet together with HOST ID1 to obtain a VXLAN packet, and send the VXLAN packet to the VTEP103 |

After receiving the address of the SERV21 from the VTEP 103 through the BGP packet, the VTEP 101 determines that the SERV21 is the monitoring server according to the locally stored monitoring configuration information and determines the ID of SERV 21 to be HOST ID1 as well as the MAC address and IP address of the corresponding monitored host VM210, and when determining that it is not the VTEP that the SERV21 has migrated out of, updates the second forwarding entry as shown in the second line of Table 1-2 to be as shown in the second line of Table 1-3.

TABLE 1-3

| Match rule | action |
| --- | --- |
| Destination IP address: VM210-IP | To mirror a user packet to obtain a mirror packet, perform a VXLAN encapsulation for the mirror packet together with HOST ID1 to obtain a VXLAN packet, and send the VXLAN packet to the VTEP103 |

After receiving the address of the SERV21 from the VTEP 103 through the BGP packet, the VTEP 102 determines that the SERV21 is the monitoring server according to the locally stored monitoring configuration information and determines the ID of SERV21 to be HOST ID1 as well as the MAC address and IP address of the corresponding monitored host VM210, and when determining that it is not the VTEP that the SERV21 has migrated out of, updates the first forwarding entry as shown in the second line of Table 2-2 to be as shown in the second line of Table 2-3.

TABLE 2-3

| Match rule | action |
| --- | --- |
| Source IP address: VM210-IP | To mirror a user packet to obtain a mirror packet, perform a VXLAN encapsulation for the mirror packet together with HOST ID1 to obtain a VXLAN packet, and send the VXLAN packet to the VTEP103 |

Corresponding to the example of the above method of monitoring a packet, the present disclosure also provides an example of a VTEP to which the method of monitoring a packet is applied.

Figure 12:
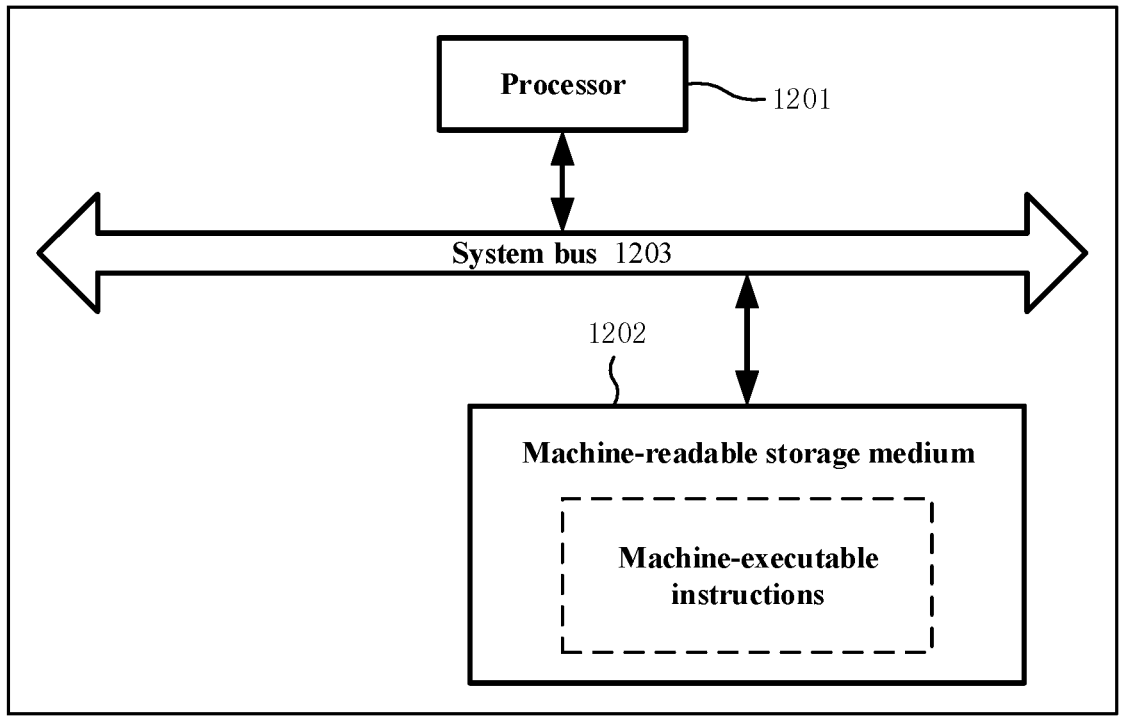
FIG. 12 illustrates a schematic diagram of a hardware structure of a VTEP according to an example of the present disclosure.

FIG. 12 illustrates a schematic diagram of a hardware structure of a VTEP according to an example of the present disclosure. The VTEP may include a processor 1201, a machine-readable storage medium 1202 having machine-executable instructions stored thereon. The processor 1201 and the machine-readable storage medium 1202 may communicate with each other via a system bus 1203. Moreover, the processor 1201 may perform the method of monitoring a packet described above by reading and executing the machine-executable instructions corresponding to a packet monitoring logic stored in the machine-readable storage medium 1202.

The machine-readable storage medium 1202 referred to herein may be any electronic, magnetic, optical, or other physical storage devices in which information may be contained or stored such as executable instructions, data, etc. For example, the machine-readable storage media may be: a Radom Access Memory (RAM), a volatile memory, a non-volatile memory, a flash memory, a storage drive (such as a hard disk drive), a solid state drive, any type of storage discs (such as compact discs, dvds, etc.), or a similar storage media, or a combination thereof.

Figure 13:
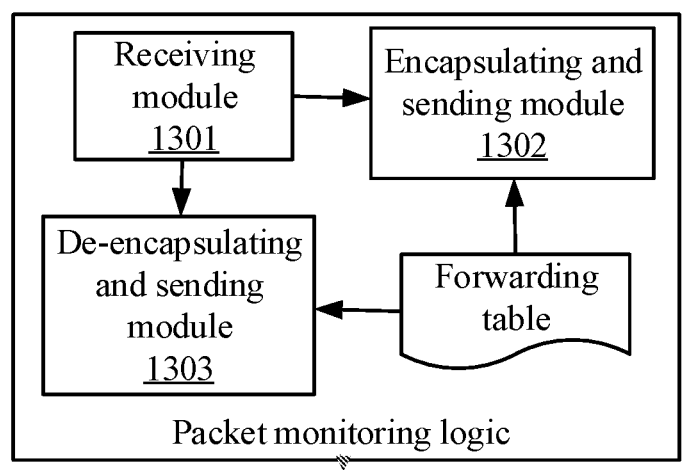
FIG. 13 illustrates a structural schematic diagram of a VTEP according to an example of the present disclosure.

Referring to FIG. 13, functionally divided, the packet monitoring logic described above includes: a receiving module 1301, an encapsulating and sending module 1302, and a de-encapsulating and sending module 1303.

In this case, the receiving module 1301 is configured to receive a packet.

The encapsulating and sending module 1302 is configured to perform a VXLAN encapsulation for a mirror packet of the packet to obtain a VXLAN packet, and send the VXLAN packet to a remote VTEP accessed by a monitoring server or send the mirror packet to a local monitoring server according to the execution action of a matching first forwarding entry if the packet received by the receiving module 1301 is a user packet from a local monitored host. The encapsulating and sending module 1302 is further configured to mirror the packet to obtain a mirror packet, perform a VXLAN encapsulation for the mirror packet to obtain a VXLAN packet, and send the VXLAN packet to the remote VTEP accessed by the monitoring server, or send the mirror packet to the local monitoring server according to the execution action of a matching second forwarding entry if the packet received by the receiving module 1301 is a user packet sent from a local host to the monitored host; where the VXLAN packet obtained by VXLAN-encapsulating the mirror packet carries the identifier of the monitoring server.

The de-encapsulating and sending module 1303 is configured to de-encapsulate a VXLAN packet to obtain a packet, and send the obtained packet to the local monitoring server according to the execution action of a matching third forwarding entry if the packet received by the receiving module 1301 is the VXLAN packet coming from the remote VTEP and carrying the identifier of the monitoring server.

Herein, the source address of the user packet from the local monitored host is the same as the packet source address in a match rule of the matching first forwarding entry; the destination address of the user packet sent from the local host to the monitored host is the same as the packet destination address in the match rule of the matching second forwarding entry; and the identifier of the monitoring server carried by the VXLAN packet is the same as the monitoring server identifier in the match rule of the matching third forwarding entry.

Figure 14:
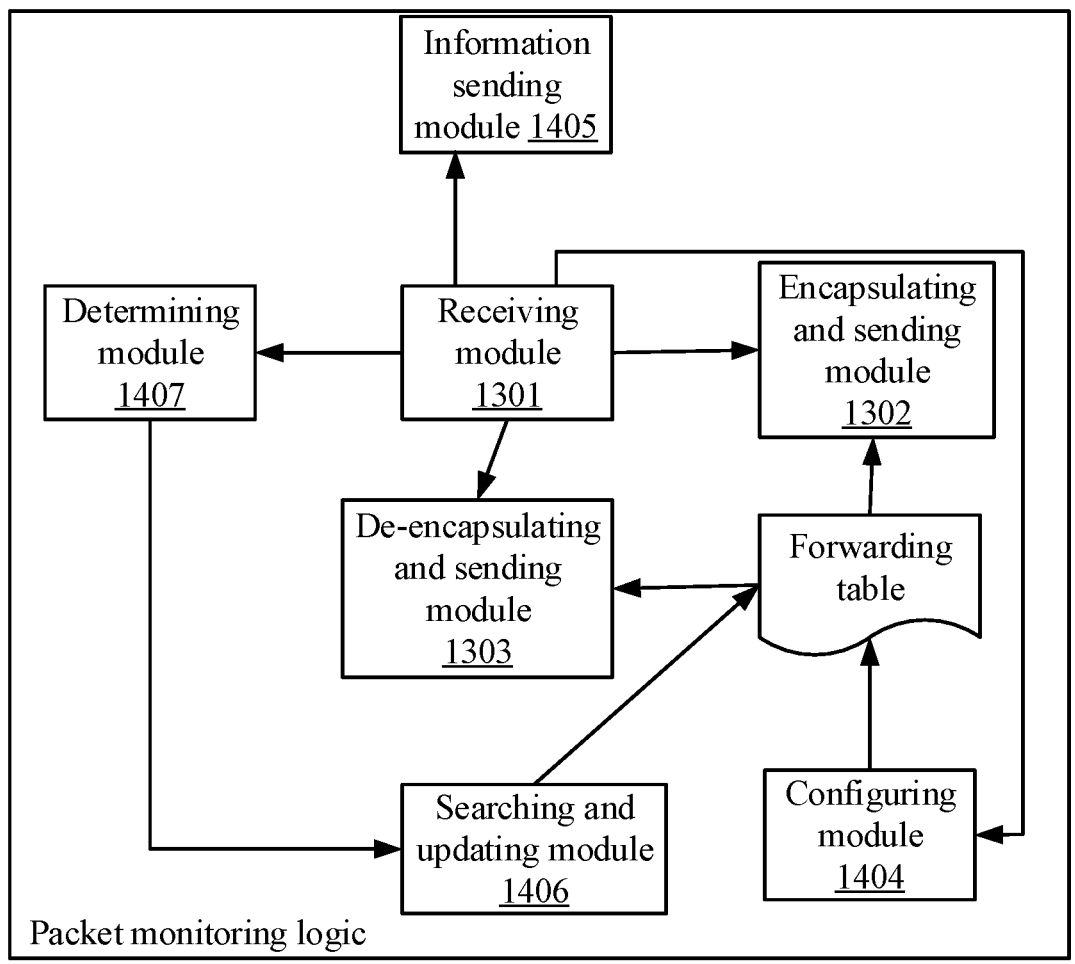
FIG. 14 illustrates another structural schematic diagram of a VTEP according to an example of the present disclosure.

As shown in FIG. 14, the packet monitoring logic described above further includes a configuring module 1404 and an information sending module 1405.

The receiving module 1301 is further configured to receive monitoring configuration information sent by a controller when the VTEP is a VTEP accessed by the monitored host, where the monitoring configuration information includes at least the address of the monitored host and the identifier of the VXLAN to which the monitored host belongs, the address of the monitoring server, and the identifier of the monitoring server; is further configured to receive the monitoring configuration information sent by the remote VTEP when the VTEP is a VTEP not accessed by the monitored host; and is further configured to receive the monitoring configuration information sent by the remote VTEP when the VTEP is a VTEP accessed by the monitoring server.

The configuring module 1404 is configured to configure the first forwarding entry in a local forwarding table after the receiving module 1301 has received the monitoring configuration information sent by the controller; is further configured to configure the second forwarding entry in the local forwarding table after the receiving module 1301 has received the monitoring configuration information sent by the remote VTEP and when the VTEP is a VTEP not accessed by the monitored host; and is further configured to configure the third forwarding entry in the local forwarding entry after the receiving module 1301 has received the monitoring configuration information sent by the remote VTEP and when the VTEP is a VTEP accessed by the monitored host.

The information sending module 1405 is configured to send the monitoring configuration information to all remote VTEPs after the receiving module 1301 has received the monitoring configuration information sent by the controller.

As shown in FIG. 14, the packet monitoring logic described above further includes a searching and updating module 1406.

In this case, the information sending module 1405 is further configured to send the address of the monitored host to all remote VTEPs after detecting that the monitored host has migrated into the VTEP.

The searching and updating module 1406 is configured to search the local forwarding table for the second forwarding entry of which the packet destination address in the match rule is the address of the monitored host, and update the searched second forwarding entry as the first forwarding entry of which the packet source address in the match rule is the address of the monitored host after detecting that the monitored host has migrated into the VTEP.

As shown in FIG. 14, the packet monitoring logic described above further includes a determining module 1407.

In this case, the receiving module 1301 is further configured to receive the address of the monitored host sent by the remote VTEP.

The determining module 1407 is configured to determine whether it is the VTEP that the monitored host has migrated out of after the receiving module 1301 receives the address of the monitored host sent by the remote VTEP.

The searching and updating module 1406 is configured to search the local forwarding table for the first forwarding entry of which the packet source address in the match rule is the address of the monitored host, and update the searched first forwarding entry as the second forwarding entry of which the packet destination address in the match rule is the address of the monitored host if the determining module 1406 determines that it is the VTEP that the monitored host has migrated out of.

Figure 15:
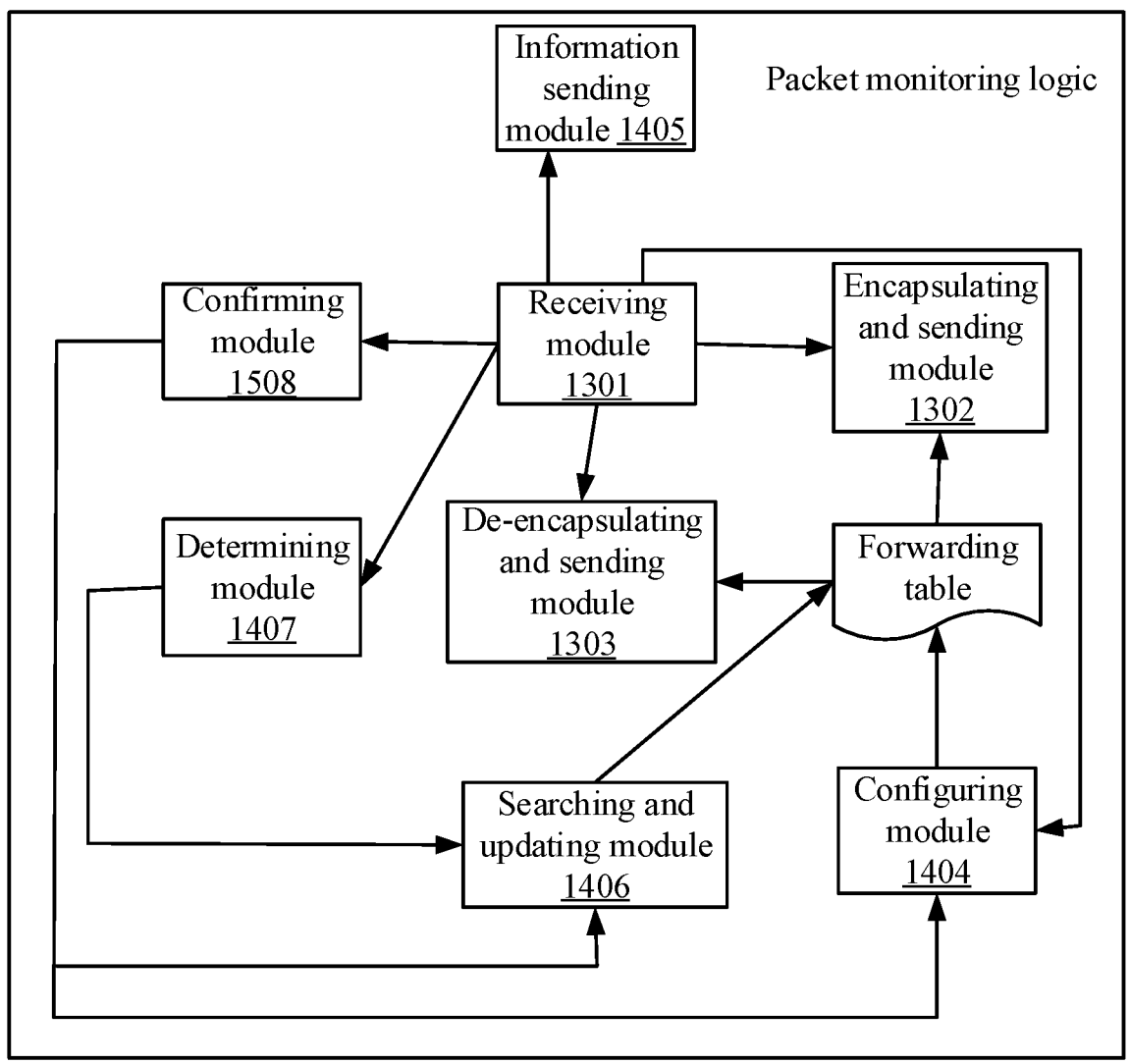
FIG. 15 illustrates still another structural schematic diagram of a VTEP according to an example of the present disclosure.

As shown in FIG. 15, the packet monitoring logic described above further includes a confirming module 1508.

In this case, the information sending module 1405 is further configured to send the address of the monitoring server to all remote VTEPs after detecting that the monitoring server has migrated into the VTEP.

The confirming module 1508 is configured to confirm the address of the monitored host corresponding to the monitoring server and the identifier of the monitoring server after detecting that the monitoring server has migrated into the VTEP.

The searching and updating module 1406 is configured to, after the determining module 1508 confirms the address of the monitored host corresponding to the monitoring server, search the local forwarding table for the first forwarding entry of which the packet source address in the match rule is the address of the monitored host or the second forwarding entry of which the packet destination address in the match rule is the address of the monitored host, and update the execution action of the searched first forwarding entry or the searched second forwarding entry so as to mirror the packet to obtain a mirror packet and send the mirror packet to the local monitoring server.

The configuring module 1404 is further configured to configure the third forwarding entry in the local forwarding table after the confirming module 1508 confirms the identifier of the monitored server corresponding to the monitoring server, where the monitoring server identifier in the match rule of the third forwarding entry is the identifier of the monitoring server migrated into the VTEP.

As shown in FIG. 15, the packet monitoring logic described above further includes a confirming module 1508.

In this case, the receiving module 1301 is further configured to receive the address of the monitoring server sent by the remote VTEP.

The confirming module 1508 is configured to confirm the address of the monitored host corresponding to the monitoring server and the identifier of the monitoring server after the receiving module 1301 receives the address of the monitoring server sent by the remote VTEP.

The determining module 1407 is configured to determine whether it is the VTEP that the monitoring server has migrated out of after the receiving module 1301 receives the address of the monitoring server sent by the remote VTEP.

The searching and updating module 1406 is configured to: if the determining module 1407 determines that it is the VTEP that the monitoring server has migrated out of, after the confirming module 1508 confirms the address of the monitored host corresponding to the monitoring server and the identifier of the monitoring server, search the local forwarding table for the first forwarding entry of which the packet source address in the match rule is the address of the monitored host or the second forwarding entry of which the packet destination address in the match rule is the address of the monitored host, update the execution action of the searched first forwarding entry or the searched second forwarding entry so as to mirror the packet to obtain a mirror packet, perform a VXLAN encapsulation for the mirror packet to obtain a VXLAN packet, and send the VXLAN packet to the remote VTEP into which the monitoring server has migrated, and search the local forwarding table for the third forwarding entry of which the match rule contains the identifier of the monitoring server and delete the third forwarding entry. The searching and updating module 1406 is further configured to: if the determining module 1407 determines that it is not the VTEP that the monitoring server has migrated out of, after the confirming module 1508 confirms the address of the monitored host corresponding to the monitoring server, search the local forwarding table for the first forwarding entry of which the packet source address in the match rule is the address of the monitored host or the second forwarding entry of which the packet destination address in the match rule is the address of the monitored host, and update the execution action of the searched first forwarding entry or the searched second forwarding entry so as to mirror the packet to obtain a mirror packet, perform a VXLAN encapsulation for the mirror packet to obtain a VXLAN packet, and send the VXLAN packet to the remote VTEP into which the monitoring server has migrated.

The implementation process of the functions and effects of each unit in the above device is described in detail in the implementation process of the corresponding blocks in the above method, which will not be described herein.

For the device examples, since they correspond substantially to the method examples, a reference may be made to the partial description of the method examples for the related part. The device examples described above are merely illustrative, where the unit described as a separating component may or may not be physically separate, and the component shown as a unit may or may not be a physical unit, which may be located in one place or may be distributed to a plurality of network units. A part or all of the modules may be selected according to the actual needs to achieve the object of the solution of the present disclosure. One of ordinary skill in the art will understand and practice without paying creative work.

The foregoing is intended only as a preferred example of the present disclosure and is not intended to be limiting of the present disclosure, and any modifications, equivalent substitutions, improvements, and the like, which are made within the spirit and principles of the present disclosure, should fall within the scope of protection of the present disclosure.

The invention claimed is:

1. A method of monitoring a packet, comprising:
receiving, by a Virtual Extensible Local Area Network (VXLAN) Tunnel End Point (VTEP), a packet;
in case that the packet is a user packet from a local monitored host,
performing, by the VTEP, the following operations according to a first forwarding entry matching with the packet:
mirroring, by the VTEP, the packet to obtain a mirror packet,
performing, by the VTEP, a VXLAN encapsulation for the mirror packet to obtain a VXLAN packet, and
sending, by the VTEP, the VXLAN packet to a remote VTEP accessed by a monitoring server, or
sending the mirror packet to a local monitoring server;
in case that the packet is a user packet to be sent from a local host to a monitored host,
performing, by the VTEP, the following operations according to a second forwarding entry matching with the packet:
mirroring, by the VTEP, the packet to obtain the mirror packet,
performing, by the VTEP, a VXLAN encapsulation for the mirror packet to obtain a VXLAN packet, and
sending, by the VTEP, the VXLAN packet to a remote VTEP accessed by a monitoring server, or
sending, by the VTEP, the mirror packet to a local monitoring server; and
in case that the packet is a VXLAN packet coming from a remote VTEP and carrying an identifier of a monitoring server,
performing, by the VTEP, the following operations according to a third forwarding entry matching the packet:
de-encapsulating, by the VTEP, the VXLAN packet to obtain a packet, and
sending, by the VTEP, the obtained packet to a local monitoring server,
wherein a source address of the user packet from the local monitored host is the same as a packet source address in a match rule of the first forwarding entry;
wherein a destination address of the user packet sent from the local host to the monitored host is the same as a packet destination address in a match rule of the second forwarding entry; and
wherein the identifier of the monitoring server carried by the VXLAN packet is the same as a monitoring server identifier in the match rule of the third forwarding entry;
the method further comprising:
receiving, by the VTEP, monitoring configuration information sent by a controller when the VTEP is accessed by the monitored host,
configuring, by the VTEP, the first forwarding entry in a local forwarding table, and
sending, by the VTEP, the monitoring configuration information to all remote VTEPs;
receiving, by the VTEP, the monitoring configuration information sent by the remote VTEP when the VTEP is not accessed by the monitored host, and
configuring, by the VTEP, the second forwarding entry in the local forwarding table; and
receiving, by the VTEP, the monitoring configuration information sent by the remote VTEP when the VTEP is accessed by the monitoring server, and
configuring the third forwarding entry in the local forwarding table;
wherein the monitoring configuration information comprises at least an address of the monitored host and an identifier of a VXLAN to which the monitored host belongs, an address of the monitoring server, and an identifier of the monitoring server.

2. The method according to claim 1, further comprising:
sending, by the VTEP, the address of the monitored host to all remote VTEPs after detecting that the monitored host has migrated into the VTEP;
searching, by the VTEP, the local forwarding table for a second forwarding entry of which the packet destination address in the match rule is the address of the monitored host; and
updating, by the VTEP, the searched second forwarding entry as the first forwarding entry of which the packet source address in the match rule is the address of the monitored host.

3. The method according to claim 1, further comprising:
determining, by the VTEP, whether it is out of the VTEP that the monitored host has migrated after receiving the address of the monitored host from the remote VTEP;
when it is out of the VTEP that the monitored host has migrated,
searching, by the VTEP, the local forwarding table for a first forwarding entry of which the packet source address in the match rule is the address of the monitored host; and
updating, by the VTEP, the searched first forwarding entry as the second forwarding entry of which the packet destination address in the match rule is the address of the monitored host.

4. The method according to claim 1, further comprising:
sending, by the VTEP, the address of the monitoring server to all remote VTEPs after detecting that the monitoring server has migrated into the VTEP;
confirming, by the VTEP, the address of the monitored host corresponding to the monitoring server and the identifier of the monitoring server;
searching, by the VTEP, the local forwarding table for a first forwarding entry of which the packet source address in the match rule is the address of the monitored host or a second forwarding entry of which the packet destination address in the match rule is the address of the monitored host;
updating, by the VTEP, an execution action of the searched first forwarding entry or the searched second forwarding entry to sending the mirror packet to the monitoring server; and
configuring, by the VTEP, the third forwarding entry in the local forwarding table, wherein the monitoring server identifier in the match rule of the third forwarding entry is the identifier of the monitoring server migrating into the VTEP.

5. The method according to claim 1, further comprising:
confirming, by the VTEP, the address of the monitored host corresponding to the monitoring server and the identifier of the monitoring server after receiving the address of the monitoring server from the remote VTEP;
determining, by the VTEP, whether it is out of the VTEP that the monitoring server has migrated;
when it is out of the VTEP that the monitoring server has migrated,
    searching, by the VTEP, the local forwarding table for a first forwarding entry of which the packet source address in the match rule is the address of the monitored host or a second forwarding entry of which the packet destination address in the match rule is the address of the monitored host;
    updating, by the VTEP, an execution action of the searched first forwarding entry or the searched second forwarding entry so as to mirror the packet to obtain the mirror packet, perform a VXLAN encapsulation for the mirror packet to obtain a VXLAN packet, and send the VXLAN packet to the remote VTEP into which the monitoring server has migrated;
    searching, by the VTEP, the local forwarding table for a third forwarding entry of which the match rule contains the identifier of the monitoring server, and
    deleting, by the VTEP, the third forwarding entry;
when it is not out of the VTEP that the monitoring server has migrated,
    searching, by the VTEP, the local forwarding table for a first forwarding entry of which the packet source address in the match rule is the address of the monitored host or a second forwarding entry of which the packet destination address in the match rule is the address of the monitored host; and
    updating, by the VTEP, an execution action of the searched first forwarding entry or the searched second forwarding entry so as to mirror the packet to obtain the mirror packet, perform a VXLAN encapsulation for the mirror packet to obtain a VXLAN packet, and send the VXLAN packet to the remote VTEP into which the monitoring server has migrated.

6. A Virtual Extensible Local Area Network (VXLAN) Tunnel End Point (VTEP), comprising:
a processor and
a non-transitory machine-readable storage medium storing machine-executable instructions which are executable by the processor to:
    receive a packet;
    in case that the packet is a user packet from a local monitored host,
        perform the following operations according to a first forwarding entry matching with the packet:
            mirror the packet to obtain a mirror packet,
            perform a VXLAN encapsulation for the mirror packet to obtain a VXLAN packet, and
            send the VXLAN packet to a remote VTEP accessed by a monitoring server, or
            send the mirror packet to a local monitoring server;
    in case that the packet is a user packet to be sent from a local host to a monitored host,
        perform the following operations according to a second forwarding entry matching with the packet:
            mirror the packet to obtain the mirror packet,
            perform a VXLAN encapsulation for the mirror packet to obtain a VXLAN packet, and
            send the VXLAN packet to a remote VTEP accessed by a monitoring server, or
            send the mirror packet to a local monitoring server; and
    in case that the packet is a VXLAN packet coming from a remote VTEP and carrying an identifier of a monitoring server,
        perform the following operations according to a third forwarding entry matching the packet:
            de-encapsulate the VXLAN packet to obtain a packet, and
            send the obtained packet to a local monitoring server,
wherein a source address of the user packet from the local monitored host is the same as a packet source address in a match rule of the first forwarding entry;
wherein a destination address of the user packet sent from the local host to the monitored host is the same as a packet destination address in a match rule of the second forwarding entry; and
wherein the identifier of the monitoring server carried by the VXLAN packet is the same as a monitoring server identifier in the match rule of the third forwarding entry;
wherein, the processor is caused by the machine-executable instructions to:
    in the case that the VTEP is a VTEP accessed by the monitored host,
        receive and save monitoring configuration information from a controller,
        configure the first forwarding entry in a local forwarding table, and
        send the monitoring configuration information to all remote VTEPs;
    in the case that the VTEP is a VTEP not accessed by the monitored host,
        receive the monitoring configuration information from the remote VTEP, and
        configure the second forwarding entry in the local forwarding table; and in the case that the VTEP is a VTEP accessed by the monitoring server,
receive the monitoring configuration information from the remote VTEP, and
configure the third forwarding entry in the local forwarding table;
wherein the monitoring configuration information comprises at least an address of the monitored host and an identifier of a VXLAN to which the monitored host belongs, an address of the monitoring server, and an identifier of the monitoring server.

7. The VTEP according to claim 6, wherein the processor is caused by the machine-executable instructions to:
send the address of the monitored host to all remote VTEPs after detecting that the monitored host has migrated into the VTEP;
search the local forwarding table for a second forwarding entry of which the packet destination address in the match rule is the address of the monitored host; and
update the searched second forwarding entry as the first forwarding entry of which the packet source address in the match rule is the address of the monitored host.

8. The VTEP according to claim 6, wherein the processor is caused by the machine-executable instructions to:
determine whether it is out of the VTEP that the monitored host has migrated after receiving the address of the monitored host from the remote VTEP;
when it is out of the VTEP that the monitored host has migrated,
search the local forwarding table for a first forwarding entry of which the packet source address in the match rule is the address of the monitored host; and
update the searched first forwarding entry as the second forwarding entry of which the packet destination address in the match rule is the address of the monitored host.

9. The VTEP according to claim 6, wherein the processor is caused by the machine-executable instructions to:
send the address of the monitoring server to all remote VTEPs after detecting that the monitoring server has migrated into the VTEP;
confirm the address of the monitored host corresponding to the monitoring server and the identifier of the monitoring server;
search the local forwarding table for a first forwarding entry of which the packet source address in the match rule is the address of the monitored host or a second forwarding entry of which the packet destination address in the match rule is the address of the monitored host;
update an execution action of the searched first forwarding entry or the searched second forwarding entry to sending the mirror packet to the monitoring server; and
configure the third forwarding entry in the local forwarding table, wherein the monitoring server identifier in the match rule of the third forwarding entry is the identifier of the monitoring server migrating into the VTEP.

10. The VTEP according to claim 6, wherein the processor is caused by the machine-executable instructions to:
confirm the address of the monitored host corresponding to the monitoring server and the identifier of the monitoring server after receiving the address of the monitoring server from the remote VTEP;
determine whether it is out of the VTEP that the monitoring server has migrated;
when it is out of the VTEP that the monitoring server has migrated,
search the local forwarding table for a first forwarding entry of which the packet source address in the match rule is the address of the monitored host or a second forwarding entry of which the packet destination address in the match rule is the address of the monitored host;
update an execution action of the searched first forwarding entry or the searched second forwarding entry so as to mirror the packet to obtain the mirror packet, perform a VXLAN encapsulation for the mirror packet to obtain a VXLAN packet, and send the VXLAN packet to the remote VTEP into which the monitoring server has migrated;
search the local forwarding table for a third forwarding entry of which the match rule contains the identifier of the monitoring server; and
delete the third forwarding entry;
when it is not out of the VTEP that the monitoring server has migrated,
search the local forwarding table for a first forwarding entry of which the packet source address in the match rule is the address of the monitored host or a second forwarding entry of which the packet destination address in the match rule is the address of the monitored host; and
update an execution action of the searched first forwarding entry or the searched second forwarding entry so as to mirror the packet to obtain the mirror packet, perform a VXLAN encapsulation for the mirror packet to obtain a VXLAN packet, and send the VXLAN packet to the remote VTEP into which the monitoring server has migrated.

* * * * *